United States Patent
Polidan et al.

[11] Patent Number: 6,105,609
[45] Date of Patent: Aug. 22, 2000

[54] FILTERED CHECK VALVE ASSEMBLY

[75] Inventors: Jeffrey Michael Polidan, Fenton; David C. Shaw, Southgate; Phillip D. Hamelin, Warren, all of Mich.

[73] Assignee: General Motors Corporation, Detroit, Mich.

[21] Appl. No.: 09/373,651

[22] Filed: Aug. 13, 1999

[51] Int. Cl.$^7$ .................................................. F16K 15/14
[52] U.S. Cl. ........................ 137/515.7; 137/843; 137/550
[58] Field of Search .................................. 137/515.7, 550, 137/843, 854, 852

[56] References Cited

U.S. PATENT DOCUMENTS

| | | | |
|---|---|---|---|
| 3,297,260 | 1/1967 | Barlow | 137/550 X |
| 3,340,899 | 9/1967 | Welty et al. | 137/843 X |
| 3,446,226 | 5/1969 | Canterbury | 137/550 X |
| 3,889,710 | 6/1975 | Brost | 137/512.15 |
| 3,895,648 | 7/1975 | Stoll et al. | 137/550 |
| 4,141,379 | 2/1979 | Manske | 137/550 X |
| 4,222,407 | 9/1980 | Ruschke et al. | 137/512.15 |
| 4,286,628 | 9/1981 | Paradis et al. | 137/843 |
| 4,655,248 | 4/1987 | Chalaire | 137/528 |
| 5,143,117 | 9/1992 | Klein | 137/515.7 X |
| 5,218,993 | 6/1993 | Steinberg et al. | 37/515.5 |
| 5,860,449 | 1/1999 | Schulte | 137/550 |

*Primary Examiner*—John Rivell
*Assistant Examiner*—Meredith H Schoenfeld
*Attorney, Agent, or Firm*—Laura C. Wideman

[57] ABSTRACT

A check valve assembly for an internal combustion engine includes a cup-shaped check valve housing having a cylindrical wall, an open end, and an upstream closed end, to define a chamber. An inlet passage extends through the closed end to introduce flow to the chamber. A filter assembly is received in the chamber, adjacent the upstream closed end of the check valve housing. A valve seat member is received in the chamber, downstream of the filter assembly, and has an annular ring slidingly received in the cylindrical wall and a valve seat extending radially inward from the annular ring with a central opening. A circular valve disk is oriented in the chamber, downstream of the valve seat member, and operates to close the central opening to prevent flow upstream through the check valve assembly and to flex allowing flow downstream through the central opening. A check valve cap is partially received within the housing to mate with the annular ring of the valve seat member and has a radial flange extending about an outer circumference. The flange provides a seating shoulder for the open end of the check valve housing. A weld seam is provided between the flange of the cap and the open end of the check valve housing such that the weld seam is located at a downstream end of the check valve assembly and the filter assembly is located at the upstream closed end to reduce the risk of distortion of the filter during welding.

5 Claims, 2 Drawing Sheets

FILTERED CHECK VALVE ASSEMBLY

TECHNICAL FIELD

The invention is directed to a filtered check valve for an internal combustion engine.

BACKGROUND OF THE INVENTION

Check valves are often used in environments with contaminants that may affect the performance of the check valve. In particular, contaminants may accumulate on the valve seat prohibiting the check valve element from sealing the valve seat opening. To alleviate this concern, check valves may be provided with a filtration device to desensitize the checking operation from the level of contaminants in the fluid flowing through the valve.

When a filter is included in the check valve, the design configuration must take into consideration processing for assembly. In particular, if the filter is included near a weld seam, the welding process may affect the filter resulting in performance issues. To counteract this concern, the filter may be composed of a material that is less heat sensitive, but such materials may have other disadvantages.

SUMMARY OF THE INVENTION

The present invention provides a check valve assembly for use in an internal combustion engine which is insensitive to small amounts of contamination in the fluid flowing through the valve. The check valve assembly includes a cup-shaped housing receiving a valve disk with associated valve seat and a filter assembly located at an upstream end of the assembly. The housing is closed by a welded cap with the weld seam at a downstream end of the assembly. Since the filter assembly is provided upstream from where the welding operation occurs, the potential of distorting the filter medium is reduced. Further, a single weld, rather than multiple welds, reduces the risk of the check valve not maintaining pressure.

For ease of assembly, the check valve disk, check valve seat member, and filter are designed to be reversible in that the component operation is insensitive to, and therefore not dependent on, the orientation of assembly. This reduces process assembly time and process assembly failure modes due to misorientation.

DESCRIPTION OF THE PREFERRED EMBODIMENT

Figure 1:
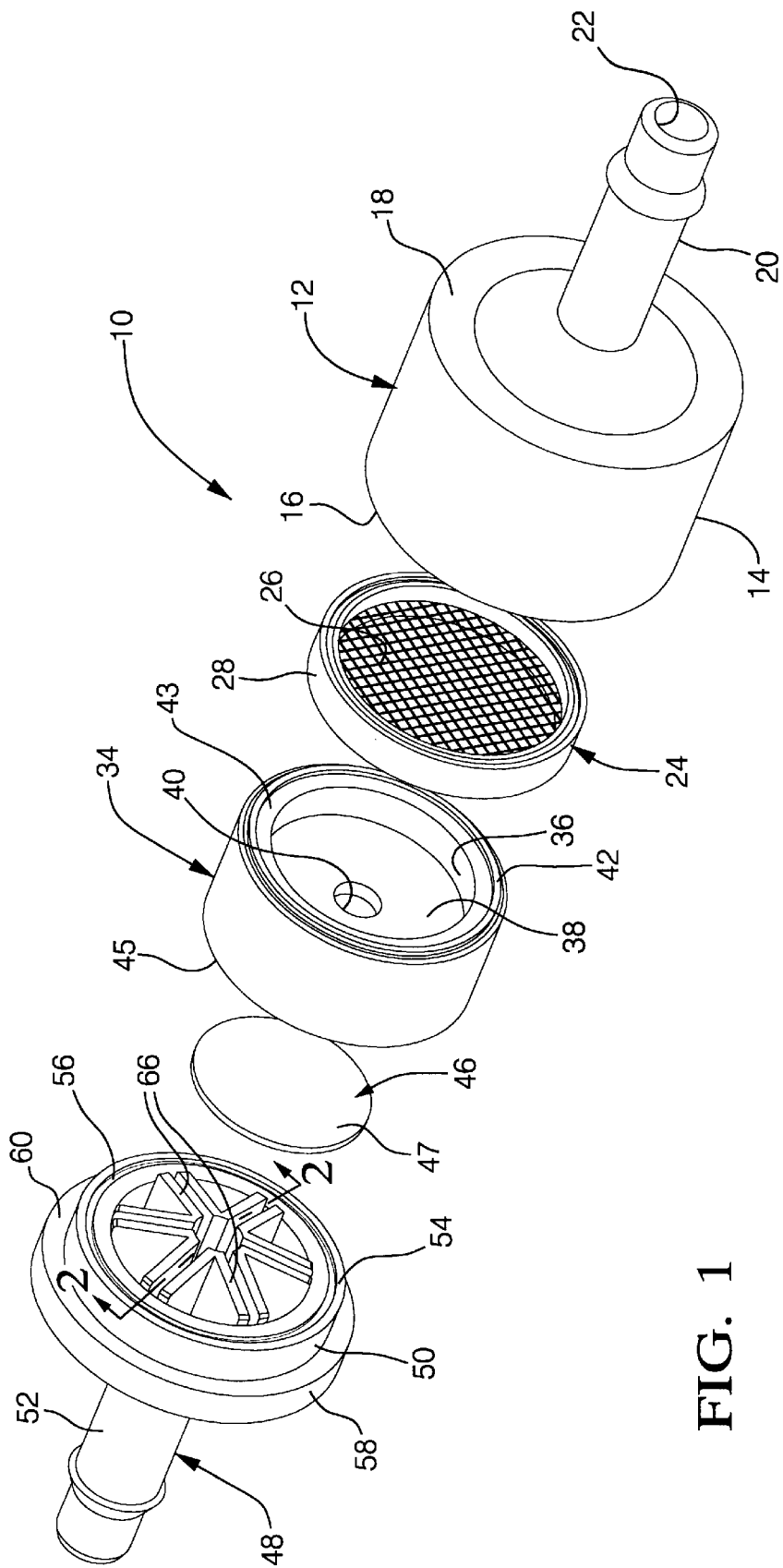
FIG. 1 is an expanded isometric view of the check valve assembly of the present invention.
Figure 2:
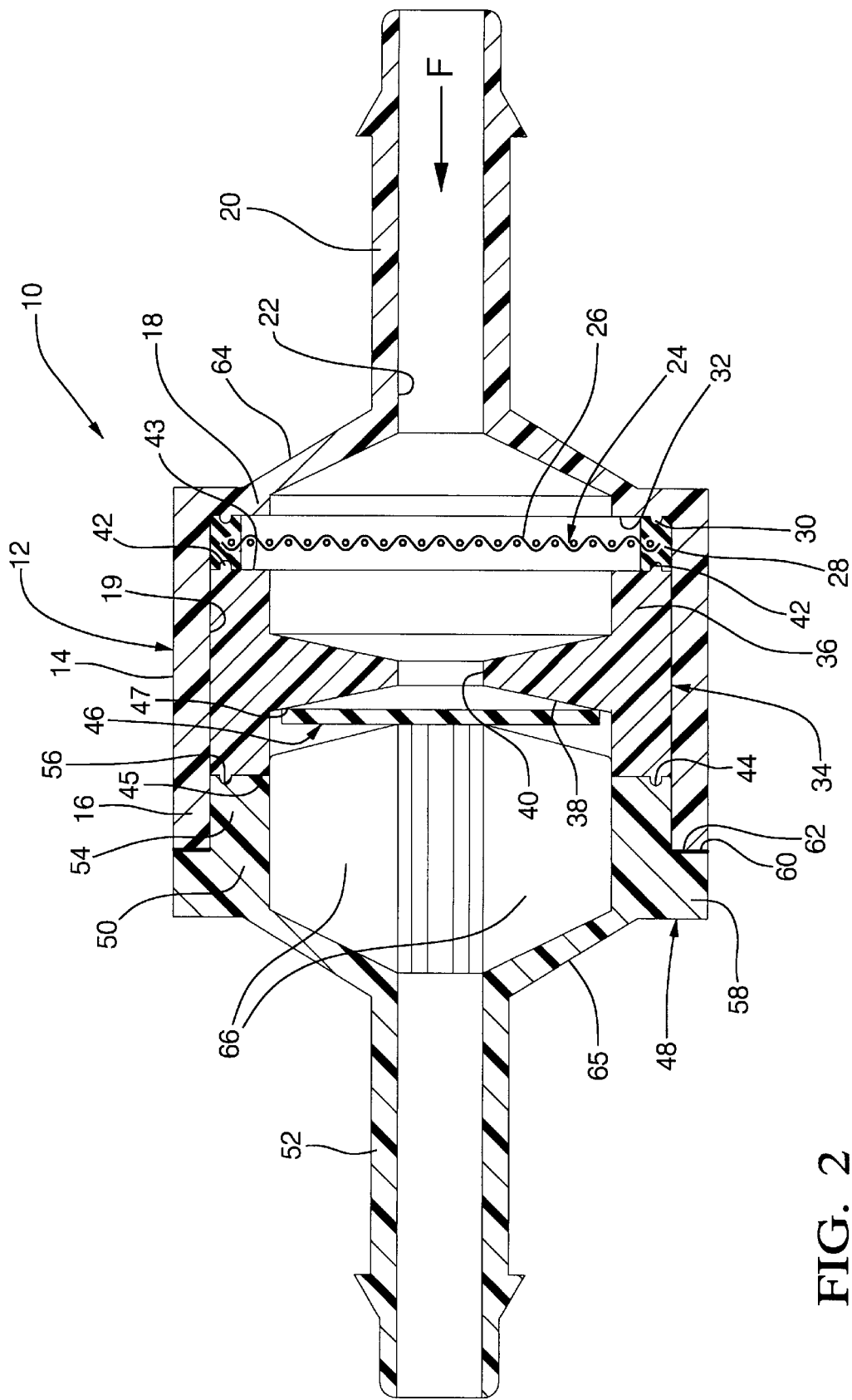
FIG. 2 is a sectional side view of the check valve assembly of FIG. 1.

FIGS. 1 and 2 illustrate a check valve assembly, generally shown as 10, of the present invention to be utilized in internal combustion engine applications. Such applications may include an air injection reactor or vehicle ventilation system. The check valve assembly 10 includes a check valve housing 12 having a cup-shaped configuration with a cylindrical wall 14 extending from an open end 16 to an upstream, closed end 18 to define a chamber 19. The housing 12 also includes an inlet cylinder 20, intersecting and adjacent the closed end 18, to define an inlet passage 22 extending through the closed end to deliver fluid flow to the chamber 19 in flow direction F illustrated in FIG. 2.

The chamber 19 of the housing 12 receives a filter assembly 24 including a circular filter medium 26 with an overmolded rubber o-ring 28. The filter o-ring 28 compressively seals against a circular bead 30 extending about the inner surface 32 of the closed end 18 of the housing 12. The filter medium 26 may be a nylon mesh material with mesh size selected based on the particular application for filtering contaminants.

A check valve seat member 34 has an annular ring 36 and a valve seat 38 extending radially inward from the annular ring. The valve seat 38 includes a central opening 40. The annular ring 36 of the valve seat member 34 includes a rib 42 extending about a first annular edge 43 of the ring 36. Since the valve seat member 34 is a symmetrical component, the annular ring 36 also includes a rib 44 extending about a second annular edge 45, symmetric to rib 42. Therefore orientation is not a factor for assembly.

The check valve seat member 34 is received within chamber 19, downstream of and adjacent to the filter assembly 24. The annular ring 36 is slidingly received in the cylindrical wall 14 of housing 12. As illustrated in FIG. 2, edge 43 is the upstream edge of the annular ring 36 and rib 42 compressively seals against the filter o-ring 28. Since the valve seat member 34 is symmetrical, it desensitizes the assembly orientation. Therefore, although not illustrated, the valve seat member 34 may also be inserted in chamber 19 such that second edge 45 is the upstream edge in which case rib 44 would compressively seal against the filter o-ring 28.

A circular valve disk 46 is oriented in chamber 19 of the housing 12, downstream of the valve seat member 34. The valve disk 46 is oriented such that the outer periphery 47 of the disk seats on the valve seat 38, thus closing the central opening 40 and prohibiting flow upstream through the check valve assembly 10. The outer periphery 47 of the valve disk 46 is operable to flex thereby permitting flow downstream through the central opening 40 of the check valve. This operation is further discussed subsequently.

The open end 16 of the check valve housing 12 is closed by a check valve cap 48 comprised of joined concentric cylinders, referred to as a mating cylinder 50 and an outlet cylinder 52. The mating cylinder 50 with open mating end 54 is received within the cylindrical wall 14 of the housing 12. The open mating end 54 includes a mating groove 56 to complement and mate with rib 44 of the annular ring 36 of the valve seat member 34. The check valve cap 48 supplies a compressive force between the valve seat member 34 and the filter o-ring 28 and between the filter o-ring and the closed end 18 of the housing 12 to maintain a pressure seal.

The check valve cap 48 also has a radial flange 58 extending about the outer circumference of the mating cylinder 50, which provides a seating shoulder 60 for the open end 16 of the housing 12. The radial flange 58 of cap 48 and the open end 16 of housing 12 are welded together to provide a leak-free weld seam 62. Since the filter assembly 24 is located at an upstream end 64 of the check valve assembly 10 and not at the downstream end 65 where the welding operation is performed, the risk of distortion of the filter medium 26 from the heat of the welding process is reduced.

Further, the check valve cap 48 includes interior ribs 66 to impart a force centralized on the valve disk 46 to hold the disk near the valve seat 38. During operation of the check valve assembly 10, fluid, such as air, flows through the inlet passage 22 of the check valve housing 12 and through the filter medium 26 of the filter assembly 24. The filter medium 26 filters contaminants to prevent them from reaching and adhering to the valve seat 38. When the pressure differential across the valve disk 46 is sufficient to flex the disk's outer periphery 47, fluid flows downstream through the central opening 40 in the valve seat member 34 and around the disk. Ribs 66 maintain a centralized force on the valve disk 46, only allowing the outer periphery 47 to flex. If the pressure differential across the valve disk is such that the outer periphery 47 of the disk 46 flexes to seal against the valve seat 38, closing off the central opening 40, fluid is prevented from flowing upstream through the check valve assembly 10.

The check valve assembly 10 disclosed herein provides a valve seat member 34, valve disk 46, and filter assembly 24 which are each symmetrically designed and therefore orientation is not a factor for assembly. This reduces assembly time and the potential for misassembled components. The check valve assembly 10 further provides a filter assembly 24 remotely located from the weld seam 62 to reduce the risk of distortion of the filter medium 26 during the welding process.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A check valve assembly for an internal combustion engine comprising a cup-shaped check valve housing having a cylindrical wall, an open end, and an upstream closed end, to define a chamber, and an inlet passage extending through said closed end to introduce flow to said chamber, a filter assembly received in said chamber and adjacent said upstream closed end of said check valve housing, having a circular filter medium and an overmolded filter o-ring, a valve seat member received in said chamber of said check valve housing downstream of said filter assembly and having an annular ring slidingly received in said cylindrical wall and a valve seat extending radially inward from said annular ring and having a central opening, a circular valve disk oriented in said chamber, downstream of said valve seat member, operable to close said central opening to prevent flow upstream through said check valve assembly and to flex allowing flow downstream through said central opening, a check valve cap partially received within said housing to mate with said annular ring of said valve seat member and having a radial flange extending about an outer circumference, which provides a seating shoulder for said open end of said check valve housing, and a weld seam provided between said radial flange of said cap and said open end of said check valve housing wherein said weld seam is located at a downstream end of said check valve assembly and said filter assembly is located at said upstream closed end to reduce the risk of distortion of said filter medium during welding.

2. A check valve assembly for an internal combustion engine, as defined in claim 1, wherein said check valve cap supplies a compressive force between said valve seat member and said filter o-ring and between said filter o-ring and said upstream closed end of said check valve housing to maintain a pressure seal.

3. A check valve assembly for an internal combustion engine, as defined in claim 2, said closed end of said check valve housing further comprising a circular bead, extending about an inner surface of said closed end to seal against said filter o-ring, and said annular ring of said valve seat member further comprising a rib extending about an upstream, first annular edge to compressively seal against said filter o-ring.

4. A check valve assembly for an internal combustion engine, as defined in claim 3, said annular ring of said valve seat member further comprising a rib extending about a second annular edge, and said check valve cap further comprising a mating end received within said cylindrical wall of said housing and having a mating groove to complement and mate with said rib extending about said second annular edge of said valve seat member.

5. A check valve assembly for an internal combustion engine, as defined in claim 4, said check valve cap further comprising interior ribs to impart a force centralized on said valve disk to hold said disk near said valve seat while allowing an outer periphery of said valve disk to flex, permitting flow downstream through said check valve assembly.

* * * * *